United States Patent
Peters

[11] 3,875,965
[45] Apr. 8, 1975

[54] SAFETY VALVE FOR CONTROLLING FLOW

[76] Inventor: Clifford M. Peters, 16 Rockwall Dr., Longview, Tex. 75601

[22] Filed: Aug. 5, 1974

[21] Appl. No.: 495,019

Related U.S. Application Data
[63] Continuation-in-part of Ser. No. 391,931, Aug. 27, 1973, abandoned.

[52] U.S. Cl............ 137/625.6; 137/460; 137/462; 137/625.66; 251/28
[51] Int. Cl..................... F16k 11/07; F16k 17/168
[58] Field of Search.......... 137/456, 460, 462, 464, 137/625.6, 625.65, 625.66, 627.5; 251/14, 28, 29

[56] References Cited
UNITED STATES PATENTS

| 2,757,516 | 8/1956 | Buttolph | 137/464 |
|---|---|---|---|
| 3,044,492 | 7/1962 | Peters et al. | 251/28 |
| 3,238,966 | 3/1966 | Howard et al. | 251/28 |
| 3,530,894 | 9/1970 | Henzgen | 137/625.6 |
| 3,549,208 | 12/1970 | Cruse | 137/627.5 |
| 3,584,652 | 6/1971 | Huntington et al. | 137/625.6 |
| 3,716,074 | 2/1973 | Peters | 137/625.6 |

Primary Examiner—Martin P. Schwadron
Assistant Examiner—George L. Walton
Attorney, Agent, or Firm—Jack W. Hayden

[57] ABSTRACT

A valve is provided with an inlet and an outlet for receiving fluid pressure from a first fluid pressure source to conduct it to a device such as a valve actuator. The valve housing includes a longitudinal bore and a slide valve for controlling communication between the inlet and outlet ports and a vent for venting the device through the outlet port when the slide valve is actuated.

Port means in the housing communicating with the slide valve and a motor means including resilient means normally urging the motor means against the last mentioned port means to normally close it off when pressure is communicated to the top and bottom of the motor means from a second source when the pressure from the second pressure source exceeds a predetermined minimum pressure.

8 Claims, 3 Drawing Figures

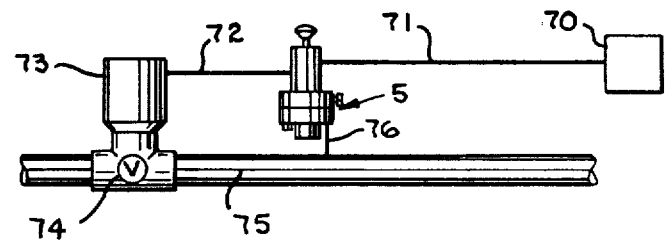
Fig-2
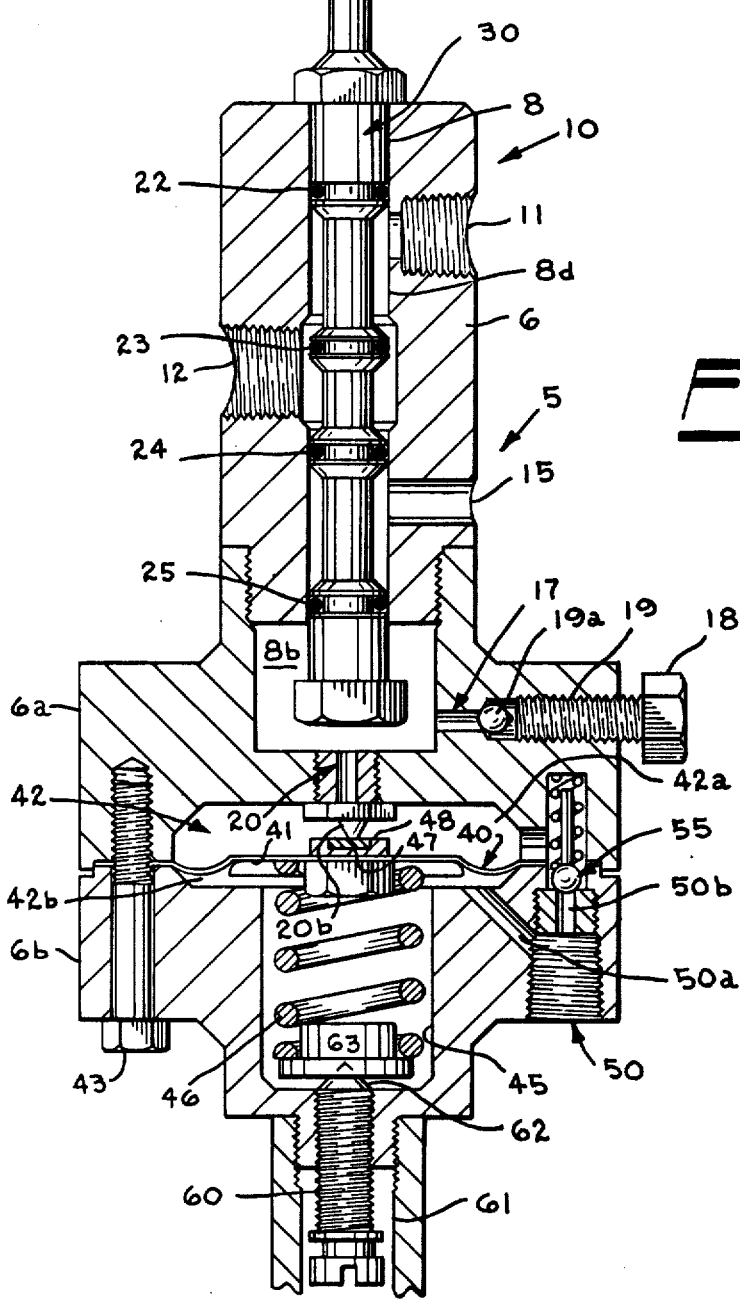
Fig-1
Fig-3

SAFETY VALVE FOR CONTROLLING FLOW

CROSS REFERENCE TO RELATED APPLICATION

The present application is a continuation-in-part of my prior copending application Ser. No. 391,931, now abandoned, filed Aug. 27, 1973.

SUMMARY OF THE INVENTION

Where there may be a fairly rapid reduction in line pressure due to excess gas usage by utility companies and the likes, it is desirable to maintain a continual flow of gas in the line under such circumstances, while shutting off line flow if there is a break or rupture in the line.

Various devices have been proposed and are in use at the present time to shut off flow from a pressure source when a pressure source falls below a predetermined minimum due to a rupture in the line with which such source is communicate, or for any other reason that may cause a malfunction.

By way of example, it is customary to store natural gas, and possibly other hydrocarbons, in reservoirs in the earth so that such gas may be withdrawn from the reservoir in the earth when it is needed. Such need may arise, for example only, during the colder months of the year when the demand for heat energy may be greater, particularly when natural gas is the stored hydrocarbon.

It can be appreciated that when withdrawal of pressure from the reservoir is initially started (which for the purposes of discussion in this application will be referred to as the second pressure source), there is an initial flow rate indicative of the initial pressure withdrawn from the reservoir. As withdrawal from the reservoir is continued over a period of time, the flow rate and the pressure decline.

It is therefore desirable to provide a valve means which functions in response to the pressure from the second source, and which also functions in response to pressure from a first source so that a valve actuator mechanism can control the flow of pressure fluid from the second source. The valve actuator mechanism is spring loaded and connected with a valve in the conduit that conducts pressure fluid from the second source, which spring loaded valve actuator normally tends to urge the valve towards closed position. Pressure fluid from the first source is conducted through the valve and acts on the valve actuator mechanism to overcome the spring force and move the valve to open position where it remains until some malfunction occurs in the conduit or line which is discharging fluid from the second source and causes the pressure therein to fall below a predetermined minimum. When this occurs the valve means of the present invention functions in response to the pressure change from the second pressure source to close off communication therethrough which in turn closes off communication between the first pressure source and the valve actuator mechanism. The valve means of the present invention also simultaneously vents the valve actuator mechanism so that the spring then closes the valve in the conduit leading from the second pressure source for closure thereof.

One type device with which applicant is familiar is the so called type SP line sentry pilot as shown in the Otis Engineering Corporation Catalogue for 1970–1971, page 3890. However, valve mechanism of this general type may have certain disadvantages in that it is referred to as a continuous bleed type valve.

The continuous bleeding from the pilot system may be hazardous in that it could sustain a fire should one occur in the area in which such bleeding occurs. Current safety regulations and requirements are such that all precautions must be taken to avoid any circumstance where there is a continual discharge of gas that might sustain a fire.

Another disadvantage with prior art devices is that they use an orifice type arrangement which must be changed as the pressure from the reservoir is depleted in order to adjust the valve to function properly at a different reservoir pressure. The construction of some prior art valves is such that the pressure thereof must be bled in order that the orifice mechanism may be changed, and this may require deactivation of the system in which such constructions are employed.

The present invention overcomes the above and other disadvantages of similar devices in that it provides an arrangement wherein the pilot supply does not continually bleed to the surrounding atmosphere. In addition, it provides an arrangement so that the valve can be adjusted externally without requiring that the system be partially or completely closed down to effect adjustment to accommodate subsequent depletion of pressure in the reservoir.

Still another object of the present invention is to provide a valve of relatively simple construction for controlling the flow of fluid from a first pressure source to a valve actuator mechanism in response to a predetermined pressure range of pressure fluid in a second pressure source, such as a reservoir in the earth in which hydrocarbons are stored or a flow line for hydrocarbons.

Yet a further object of the present invention is to provide a valve of relative simple construction for controlling the flow of fluid from a first pressure source to a valve actuator mechanism in response to a predetermined pressure of pressure fluid in a second pressure source and which includes an arrangement for externally adjusting the valve so that it will function at various ranges of pressure in the second source as depletion thereof occurs over a period of time.

Still another object of the present invention is to provide a valve of relative simple construction for controlling the flow of fluid from a first pressure source to a valve actuator mechanism in response to a predetermined pressure fluid from a second pressure source and which includes an arrangement for externally adjusting the valve so that it will function at various ranges of the pressure in the second source as depletion thereof occurs over a period of time and includes means for blocking off the supply of pilot gas to the valve actuator mechanism while the valve actuator is being bled to atmosphere, to permit closing of a valve to shut off flow from the second pressure fluid source as well as maintaining the valve of the present invention in non-bleed condition while the first pressure source is in communication with the valve actuator mechanism.

Other objects and advantages of the present invention will become more readily apparent from consideration of the following description and drawings.

BRIEF DESCRIPTION OF THE DRAWINGS

FIG. 1 is a sectional view illustrating the preferred embodiment of the present invention;

FIG. 2 is a schematic flow diagram illustrating one form of the present invention as it is employed; and FIG. 3 is a fragmentary sectional view illustrating an alternate form of the invention.

In FIG. 1 the valve of the present invention is referred to generally by the numeral 5 and is shown as including the housing 6 having the longitudinal bore 8 therein. First port means in housing 6 are referred to generally at 10 and include an inlet port 11 and an outlet port 12 which communicates with the bore 8; and third port means 17 and fourth port means 20 in housing 6 each communicate with one end 8b of the bore 8 as shown in FIG. 1.

Seal means 22, 23, 24 and 25 are provided between the slide valve means referred to generally at 30 and the longitudinal bore 8 to selectively seal off the inlet 11 from the outlet 12 when the seal means 23 is engaged within the bore portion 8d when the valve 30 is in the position shown in FIG. 1 of the drawings, seal means 24 and 25 serves to isolate the first port means 10 from the second port means 15, and seal means 25 isolates the second port means 15 from third port means 17 and fourth port means 20.

When the fourth port means 20 in housing 6 is communicated to the enlarged portion 8b of the bore 8 as will be described in detail, the slide valve means 30 is moved longitudinally of the bore 8 so that the seal means 23 engages within the bore portion 8d to close off communication between the inlet port 11 and outlet port 12 of the first port means 10 and also at such time, seal means 24 is positioned relative to outlet port 12 so as to communicate the outlet port 12 with the vent or second port means 15 while the seal means 25 continues to isolate the second port means 15 from third and fourth port means 17 and 20.

The third port means 17 is normally closed off by suitable means such as the bolt 18 which is threadedly engaged in housing 6 as illustrated at 19 and is provided on its inner end with suitably shaped ball or seat means 19a for engaging the third port means 17 and sealing it off from the interior of housing 6. When it is desired to bleed the portion 8b of the bore 8 as will be described hereinafter, the bolt 18 may be unthreaded to that pressure in bore portion 8b may bleed through the third port means 17 to atmosphere.

The housing 6 includes pressure responsive motor means referred to generally at 40 and is illustrated as being in the form of a movable diaphram 41 positioned within the chamber 42 formed between the housing portions 6a and 6b. The housing portions 6a and 6b may be secured together along with the motor means 40 clamped therebetween by any suitable means such as bolts 43 extending therethrough. The resilient means 46 will be positioned in counterbore 45 when housing portions 6a and 6b are secured together. Any suitable number of bolts may be provided for securing 6a and 6b together. The diaphram 41 divides the chamber 42 into two chamber portions 42a and 42b. The counterbore 45 in the housing portion 6b communicates with the chamber portion 42b which is on the bottom of the diaphram, and the chamber portion 42a is formed on the other side, or top of the diaphragm as shown in FIG. 1.

The housing portions 6a and 6b include port means 50 defined by the ports 50a and 50b for communicating fluid pressure from the second source of fluid pressure to act on both the bottom and the top of the diaphram 41 as shown in FIG. 1. Suitable control or regulating valve means which is shown in FIG. 1 as comprising spring loaded check valve means referred to generally at 55 are provided in the port 50b to function to close off port 50b and trap pressure in chamber portion 42a, in a manner as will be described hereinafter.

The counter bore 45 is provided with resilient means as shown as being in the form of a spring 46 which abuts the bottom of the diaphram 41 at one of its ends and is seated on support 63 adjacent the other end of the counterbore 45 as shown in FIG. 1. The diaphram 41 includes seat means 47 formed of a suitable elastomer and carried by any suitable support means 48 on diaphragm 41 adjacent fourth port means 20 as shown in FIG. 1.

The spring means 46 normally urges the motor means 40 upwardly so that the seat 47 engages the fourth port means 20 and closes it off.

More particularly, the fourth port means 20 is shown as including a cone shaped member 20b at the lower end of port means 20 having an opening therethrough, which cone shaped member is illustrated in FIG. 1 as being seated within the elastomer valve seat 47 to close off flow therethrough.

The spring 46 acting on the motor means 40 may be adjusted by the adjustment referred to generally at 60 which is carried in the opening 61 externally of the housing 6, the adjustment means 60 includes a threaded bolt extending through housing portion 6b, as shown, with the end 62 of the bolt engaging support 63 on which one end of the spring 46 is abutted.

In FIG. 3 the control valve means is shown as being in the form of a needle valve means 55'. When the FIG. 3 form is employed, third port means 17, bolt 18 and seat means 19a are moved to the left hand side of housing 6 (as viewed in FIG. 1) so as to provide space to receive needle valve means 55' in housing 6 on the right hand side in lieu of check valve means 55.

Needle valve means includes stem 70 which is threadedly received as shown at 71 in bore 72 of housing 6. The port means 50b includes the inwardly extending annular bore 73 into which extends the annular tapered end 74 of stem 70. When stem 70 is moved inwardly, tapered end 74 seats on bore 73 to close off flow through 50b and 73 and into chamber 42a as shown in FIG. 3, but stem 70 is rotatable to position 74 relative to 73 to control or regulate flow through 50b and 73 as desired and into chamber 42a.

A bushing 75' threaded as shown at 76 in housing 6 is provided with a bore 77 through which stem 70 extends.

Seal means 78 in the form of an O-ring seals off between stem 70 and bushing bore 77, to inhibit leakage from bores 50b, 73 or chamber 42a. Also, such seal accommodates longitudinal adjustment of stem 70 in bore 77 to position tapered end 74 relative to bore 73 as desired while maintaining the seal between the stem 70 and bushing 75. O-ring seal means 78' is provided between the end of bushing 75 and housing 6 to prevent leakage therearound.

The end 79 of stem 70 may have flats 80 thereon to enable stem 70 to be more easily rotated. Cap 81 is threaded on bushing 75 as shown to protect stem end 79.

The needle valve means 55' can be adjusted so as to accommodate sudden pressure drops due to increased demand in line 75 from greater usage such as in colder months and thus prevent premature actuation of valve means 5 as will be described. However, should a rupture occur in the line 75, the needle valve means 55' functions in the same manner as check valve 55 to close valve 74 as will be described.

DESCRIPTION OF OPERATION

Attention is now directed to FIG. 2 of the drawings wherein a first source of pressure fluid is referred to at 70, there being suitable conduit means 71 for connecting with the inlet port 11 of the valve of the present invention. The outlet port 12 is connected by conduit 72 to a spring loaded valve actuator diagrammatically shown at 73 which valve actuator mechanism is connected to operate the valve 74 in the conduit 75.

The conduit 75 communicates with a reservoir or other system in which natural gas or other hydrocarbons are stored or being flowed through a line, and for purposes of description herein is referred to as the second source of pressure fluid. Such second source of pressure fluid is communicated by conduit 76 to the port means 50 of the valve 10 of the present invention.

As previously noted, when flow is initiated from a reservoir it will flow at a certain pressure, and as flow from the reservoir is continued and depletion thereof occurs, the pressure will drop over a period of time. It is desirable to initially set the valve 10 so that it will respond to a predetermined minimum pressure in conduit 75 from the second source of fluid pressure and will function to close off flow of pressure fluid from the first pressure source 70 to the valve actuator mechanism 73 when the pressure in the second fluid source flowing through conduit 75 falls below a predetermined minimum.

By way of one illustration, let it be assumed that the initial flow rate from a reservoir is such that it is desired to shut off the flow if the pressure in conduit 75 falls below 1,000 pounds p.s.i. In such example, the initial pressure from the reservoir may be, by way of example 1,200–1,300 p.s.i., and it is desired to close the valve 74 in conduit 75 when the pressure in conduit 75 falls below 1,000 p.s.i. to prevent excessive gas loss, fire or other damage. By adjusting the spring 46, the valve 5 can be made to operate so that flow in conduit 75 is shut off when the pressure in conduit 75 falls below 1,000 p.s.i., in the example under consideration.

Therefore, should a rupture or some other malfunction occur in conduit 75 to reduce the pressure below 1,000 p.s.i. the present invention 5 will function to shut off the supply of pressure fluid from the first source 70 to the valve actuator mechanism 73 so that the spring loaded valve actuator 73 moves to close valve 74 and thereby shut off flow through conduit 75.

The needle valve means 55' will enable a greater range of pressure drop in line 75 due to increased demand without actuating valve means 74. The amount of restriction afforded by such valve means may be adjusted externally of housing 6 as desired from time to time and as required. However, a sudden pressure drop due to a rupture or break in line 75 would still bleed off pressure through port 50a quicker than it could through restricted port 50b so as to thereby cause the diaphragm 41 to move downwardly and unseat valve seat 47 from cone 20b.

Since needle valve 55' permits flow to continue through 50a and 50b to act in chambers 42a and 42b pressure will be maintained in chamber 42b even through line pressure in 75 falls due to increased demand, thus preventing valve 74 from closing. That is, if a pressure drop occurs in line 75 due to unusual demand, flow to chamber 42a is restricted, while flow to chamber 42b is unrestricted, thus enabling them to remain pressure balanced, or near so, so as not to move diaphragm 41 downwardly. However, if a rupture occurs in 75, such sudden pressure drop will permit the present invention to function to cause closing of valve 74 as described with regard to check valve means 55.

By referring to FIGS. 1 and 3 of the drawings, it will be noted that flow from the second source through the port means 50 is conducted by port 50a and 50b to act on both the top and the bottom of the motor means 40 so that when the pressure in conduit 75 is above the predetermined minimum the fluid pressure acting on the top and bottom of diaphragm 41 is balanced. Thus, the effective pressure tending to move the seat 47 against the cone member 20b of fourth port means 20 is the force of spring 46. The valve means 5 of the present invention is shown in FIG. 1 during normal operating conditions wherein pressure from the first pressure fluid source 70 is conducted through the inlet port 11 and discharged through the outlet port 12 to act on the spring loaded valve actuator mechanism 73 and maintain the valve 74 in open position. This is the position of the valve 5 of the present invention when the pressure of fluid on conduit 75 is in the predetermined range.

However should the pressure in conduit 75 fall below the predetermined minimum for which valve 5 is set by the adjusting means 60, the valve 5 functions to close off flow from source 70 to actuator 73 and bleed actuator 73 to atmosphere, whereupon valve 74 is closed by actuator 73.

For example should the pressure in conduit 75 fall below the predetermined minimum in conduit 75 for which the valve 5 is set to operate, due to, for example a rupture in line 75 the pressure from beneath the diaphragm 41 is bled through 50a due to the rupture in 75 whereas the spring loaded check valve 55 traps the pressure from conduit 75 in the chamber portion 42a to act against the diaphragm 41 and overcome the spring 46 to unseat diaphragm 41 and valve seat 47 from cone 20b. Thereupon the trapped fluid pressure in chamber 42a moves into the bore portion 8b through port 20 and in turn acts to move the slide valve means 30 longitudinally of the bore 8 so as to position seal means 23 adjacent bore portion 8d and close off communication between ports 11 and 12.

Simultaneously seal means 24 is positioned to communicate the outlet 12 with the second port means 15 to thereby vent the spring loaded valve actuator mechanism 73 to atmosphere whereupon the spring loaded valve actuator mechanism closes the valve 74. In other words, valve actuator mechanism 73 is spring loaded to normally close valve 74, but as long as fluid pressure from the first source is communicated through the valve 10 of the present invention, such pressure overcomes the spring in the actuator 73 and positions valve 74 in open position. Closing of valve 74, shuts off flow through 75 and prevents dissipation of fluid from the second source and may prevent a fire or other damage in the system as well as loss of the gas from the reservoir or other system.

After the malfunction has been corrected, the bolt 18 may be unthreaded to bleed off the pressure in bore portion 8b through port means 17, whereupon such bolt may be reseated to close off the port means 17. The slide valve means 30 will keep valve 74 closed, but when desired may be pushed down by means of the handle 30a so as to communicate the inlet 11 and outlet 12 with the first pressure source 70 to act on the valve actuator mechanism 73 and open valve 74. When the pressure in conduit 75 is within the range set by valve 5 the system will thereafter continue to function until some other malfunction occurs in conduit 75. It can be appreciated that the pressure from the first fluid source never falls within and is less than the pressure in conduit 75.

As previously mentioned, as gas is depleted from the storage reservoir, the pressure discharged therefrom gradually reduces and it is then necessary to readjust the spring 46 accordingly. The present invention is particularly advantageous in that such adjustment may be accomplished externally of the valve housing 6 and without taking the system out of operation. Thus, any hazards due to bleeding of the system which may be required with other prior art devices is eliminated.

Also, it will be noted that the gas supply from the first pressure source 70 is not continuously bleeding to atmosphere as is the case with some prior art devices, rather the only time that the gas is bled to atmosphere is when the actuator communicates through outlet 12 with port 15 or when the bolt 18 is unseated to bleed bore portion 8b.

The foregoing disclosure and description of the invention are illustrative and explanatory thereof, and various changes in the size, shape, and materials as well as in the details of the illustrated construction may be made without departing from the spirit of the invention.

What is claimed is:

1. A safety pilot valve responsive to a predetermined mimimum pressure in a fluid pressure source comprising:
   a. a housing;
   b. a bore extending longitudinally of said housing;
   c. slide valve means movable within the bore;
   d. first port means in said housing including inlet and outlet ports communicating with the bore;
   e. second port means in said housing communicating with the bore;
   f. third port means in said housing and communicating with the bore;
   g. seal means between said slide valve means and bore for sealing therebetween to selectively isolate the first and second port means, tne inlet and outlet of the first port means and to isolate the first and second port means from the third port means;
   h. means normally closing off the third port means but movable to vent to atmosphere the bore below the seal means which isolates the third port means from the first and second port means;
   i. fourth port means in said housing communicating with the bore below the seal means which isolates the third port means from the first and second port means;
   j. pressure responsive motor means carried by said housing;
   k. seat means carried by said motor means and positioned for engaging and closing off the fourth port means;
   l. resilient means carried by said housing and normally urging said motor means and seat to engage and close off the fourth port means;
   m. port means for communicating fluid pressure from the source to act on the top and bottom of said motor means; and
   n. control valve means in the port means to trap the fluid pressure on the top of the motor means when the pressure in the fluid source falls below a predetermined minimum pressure to thereby overcome the resilient means and open the fourth port means whereby the trapped fluid pressure on top of the motor means acts on said slide valve means to close off communication between the inlet and outlet ports and to communicate the outlet port with the second port means.

2. The invention of claim 1 including adjusting means mounted on and accessible externally of said housing for varying the force of the resilient means acting on said motor means.

3. The invention of claim 1 wherein said control valve means is a spring loaded check valve.

4. The invention of claim 1 wherein said control valve means is an adjustable needle valve.

5. A valve for controlling communication between a first fluid pressure source and an actuator mechanism, the valve also being responsive to a predetermined minimum pressure in a second fluid pressure source comprising:
   a. a housing;
   b. a bore extending longitudinally of said housing;
   c. slide valve means movable within the bore;
   d. first port means in said housing including inlet and outlet ports for communicating fluid from the first fluid pressure source through said housing to the actuator mechanism;
   e. second port means in said housing communicating with the bore and with the outlet port to vent the actuator mechanism when the inlet and outlet ports are closed off from each other by said slide valve means;
   f. third port means in said housing and communicating with the bore;
   g. seal means between said slide valve means and bore for sealing therebetween to selectively isolate the first and second port means, the inlet and outlet of the first port means and to isolate the first and second port means from the third port means;
   h. means normally closing off the third port means but movable to vent to atmosphere the bore below the seal means which isolates the third port means from the first and second port means;
   i. fourth port means in said housing communicating with the bore below the seal means which isolates the third port means from the first and second port means;
   j. pressure responsive motor means carried by said housing;
   k. seat means carried by said motor means and positioned for engaging and closing off the fourth port means;
   l. resilient means carried by said housing and normally urging said motor means and seat to engage and close off the fourth port means;
   m. port means for communicating fluid pressure from the second source to act on the top and bottom of said motor means; and n. control valve means in the port means to trap fluid pressure from the second source on the top of the motor means when the pressure in the second source falls below a predetermined minimum to thereby overcome the resilient means and open the fourth port means whereby the trapped fluid pressure on top of the motor means acts on said slide valve to close off the inlet port from the outlet port to shut off communication between the first fluid pressure source and the actuator mechanism and to vent the actuator mechanism through the outlet port and second port means.

6. The invention of claim 5 including adjusting means mounted on and accessible externally of said housing for varying the force of the resilient means acting on said motor means.

7. The invention of claim 5 wherein said control valve means is a spring loaded check valve.

8. The invention of claim 5 wherein said control valve means is an adjustable needle valve.

* * * * *